(12) United States Patent
van de Capelle et al.

(10) Patent No.: US 8,164,766 B2
(45) Date of Patent: Apr. 24, 2012

(54) ELECTRONIC FORMAT FILE CONTENT SENSITIVE USER INTERFACE

(75) Inventors: Jean-Pierre R M. van de Capelle, Rochester, NY (US); Katherine Loj, Rochester, NY (US); Michael E. Farrell, Ontario, NY (US)

(73) Assignee: Xerox Corporation, Norwalk, CT (US)

( * ) Notice: Subject to any disclaimer, the term of this patent is extended or adjusted under 35 U.S.C. 154(b) by 1027 days.

(21) Appl. No.: 11/542,489

(22) Filed: Oct. 3, 2006

(65) Prior Publication Data
US 2008/0079977 A1 Apr. 3, 2008

(51) Int. Cl.
G06F 3/12 (2006.01)
(52) U.S. Cl. ...................................... 358/1.13
(58) Field of Classification Search .................. 358/1.15, 358/1.13
See application file for complete search history.

(56) References Cited

U.S. PATENT DOCUMENTS

| | | | |
|---|---|---|---|
| 6,483,607 | B1 | 11/2002 | Van de Capelle et al. |
| 6,798,536 | B1 * | 9/2004 | Muramoto ................ 358/1.9 |
| 2002/0051139 | A1 * | 5/2002 | Akabane et al. ........... 358/1.2 |
| 2002/0126873 | A1 * | 9/2002 | Alattar et al. ............ 382/100 |
| 2002/0193956 | A1 | 12/2002 | Van de Capelle et al. |
| 2003/0202213 | A1 * | 10/2003 | Saito ...................... 358/1.18 |
| 2004/0156075 | A1 * | 8/2004 | Hohensee et al. ......... 358/1.15 |
| 2005/0036170 | A1 * | 2/2005 | Okuoka et al. ........... 358/1.16 |
| 2005/0150411 | A1 | 7/2005 | Bestmann |
| 2006/0050294 | A1 * | 3/2006 | Smith et al. ............. 358/1.15 |
| 2007/0030516 | A1 * | 2/2007 | Tsuji et al. ............. 358/1.15 |
| 2007/0070377 | A1 * | 3/2007 | Hirabayashi ............. 358/1.13 |

OTHER PUBLICATIONS

Adobe Systems Inc. (PostScript Language Reference, third edition, ISBN 0-201-37922-8) pp. 97, 145, 180, 188, 211, 216, 262, 322, 399, 401, 411, 413, 414, 417, 443, 448, Feb. 1999.*

* cited by examiner

*Primary Examiner* — Benny Q Tieu
*Assistant Examiner* — Qian Yang
(74) *Attorney, Agent, or Firm* — Kermit D. Lopez; Luis M. Ortiz; Tuesday A. Kaasch

(57) ABSTRACT

A method is provided for enabling adaptive print job content processing as a function of the electronic format and content of files, received by a digital print production environment providing access to a display in the form of a user interface able to select job content processing options. The method includes receiving a print job in one or more electronic format files, with the print job including supplementary information for one or more electronic format files. Depending on the electronic format of the files, job programming options are structured, with options including parameter(s), parameter value(s), and parameter selectability. Programming options are presented on the user interface for review and possible modification by an operator. A determination is made as to whether any operator modifications have been indicated. If operator modifications have been indicated, the parameter value(s) affected are adjusted.

21 Claims, 5 Drawing Sheets

ELECTRONIC FORMAT FILE CONTENT SENSITIVE USER INTERFACE

CROSS REFERENCE TO RELATED APPLICATION

Reference is made to commonly-assigned copending U.S. patent application Ser. No. 11/542,366, filed herewith, entitled "Electronic Format File Content Sensitive User Interface", by Jean-Pierre R. Van De Capelle, et al., the disclosures of which are incorporated herein.

BACKGROUND AND SUMMARY

This disclosure relates generally to computerized color graphics, color reproduction, and electronic printing systems, and more particularly to a user interface system and method in which user interface options are dependent on electronic file format content.

Computerized color graphics systems and electronic printing systems are known in the art. Typically, they enable an operator to produce a color image—any visual two-dimensional pattern including one or more text, graphic line art elements, continuous tone image elements, and so forth—and from that image to produce a representation that can be printed using a color reproduction system, for example, by producing color separation plates for offset printing, gravure printing, and flexographic printing. It is desirable to be able to reliably simulate the output of a production press on a digital printer for a short run sample of the final product, but the accuracy of such samples has been limited in the past due to difficulties in matching colors specified for a job on the production press with those available on a typical four-color digital printer. In the context of this application, production presses print using a variety of simultaneous spot color inks as well as primary colors, which are generally cyan, magenta, yellow, and black, although extended gamut presses may utilize additional or alternate primary colors, sometimes also referred to as spot color inks.

In contrast, digital presses or digital printers have less or no support for simultaneous spot color inks. A typical production system includes the press as well as remote software applications preparing and/or submitting files to the press or plate setter for print production. A digital production system includes the remote software applications and the digital press. In general the remote software applications and the digital production press or the production press can communicate capabilities.

Designers can use spot color inks, for example Pantone® inks, in two different ways: the first is to specify a color, and the second is to specify an ink with which the design will be printed on an offset, gravure or flexo press. The expected behavior of an object defined with a "spot color", or an ink, placed on top or underneath another object within the design, depends on the designer's intent. When the spot color is used to define a color, usually it is expected to render the color. When the spot color is intended to be used as an ink on a press, the final appearance of overprinting objects on that press will be different. When such a file is to be printed on a digital, four-color press, for a short run sample of the final product, for instance a package, the color rendering of spot color object overprinting with other objects in the file has to be rendered according to the intent of the designer. To complicate matters, in a single print job certain spot colors may have been used merely to specify the color, and others may have been intended to be used as an ink on a press.

Currently there is no satisfactory solution in digital front ends for color printers to address this problem. Existing controllers for digital printers do not include options in a graphical user interface for setting overprint options on an ink basis, depending on the job content. Therefore, what is needed is a method that provides a Print job content analysis step on a file submitted to a printer controller in which the file is analyzed to identify the use of spot inks and adapt overprinting behavior to reflect the desired output of the production press on the short run press.

In general, PDL content sensitive GUI options are not being used in the industry. In contrast it is common practice to display all possible PDL processing options for a certain PDL type, even though some of these options may not influence the specific PDL's processing because of the PDL's content. This can be confusing to the operator, who may change a setting thinking it will affect the output only to find out that there is no influence or to confuse other changes in the system, such as changes in the PDL or change in system response, with the change in GUI selection.

All U.S. patents and published U.S. patent applications cited herein are fully incorporated by reference. The following patents or publications are noted:

U.S. Pat. No. 6,483,607 to Van de Capelle et al. ("Method and Device for Determining the Color Appearance of Color Overprints") describes a method for determining a small number of parameters that spectrally characterize colorants and for using the colorant parameters to predict the spectral reflection or transmission characteristics of the colorants when they are deposited on top of one another on an opaque, transparent, or semitransparent carrier of a particular type. Each colorant is deposited with a certain coverage percentage, for example, dot percentage in the case of offset printing. The colorant parameters of any colorant are substantially independent of the color of the substrate and include dependency on the colorants deposited before and after. Measurements of sets of prints of varying coverage percentages of a colorant on a number of backgrounds are made and the resulting set of equations for the colorant are solved. Colorants that are defined by a recipe of basic colorants are characterized from measurements on prints of the basic colorants. However, while Van de Capelle provides a method for spectrally characterizing colorants, he does not teach a graphical user interface for simulating the behavior of production press spot inks on a digital press.

U.S. Patent Application Publication No. 2005/0150411 to Bestmann ("Method for the Reproduction of Spot Colors with Primary Printing Inks and Secondary Printing Inks") describes method for reproducing spot colors (special colors or decorative colors) with a combination of the primary printing inks cyan, magenta, yellow, black, and at least one secondary printing ink red, green, blue. A first test form is printed with the primary printing inks and measured colorimetrically. Further test forms, in which one of the colored primary printing inks is replaced by a substantially complementary secondary printing ink, are printed and measured colorimetrically. An ICC color profile is calculated from the measured data of each test form. For each spot color to be reproduced, the proportions of printing inks of the ICC color profile achieving the lowest deviation between the spot color and the reproduced color are determined. The printing ink combination belonging to that ICC profile is selected for the reproduction of the spot color. However, Bestmann provides only a means to identify printing ink combinations to reproduce a spot color and does not speak to a method for simulating production press spot ink behavior on a digital press through a graphical user interface.

U.S. Patent Application Publication No. 2002/0193956 to Van de Capelle et al. ("Method and Device for Determining the Color Appearance of Color Overprints") teaches a method for predicting the color of an overprint of a set of colorants at a set of coverage percentages on a substrate using a printing technique, with the colorants including some for which a device profile is provided. The method includes determining the colorant parameters of the device profile colorants, determining the spectrum of the substrate, providing spectral colorant parameters for the non-device profile colorants, and determining the color of the overprint. The data of the device profile may be modified such that the identified colorant parameters determine the colorant parameters of modified colorants that match the color of the device profile colorants and that cover the gamut of the device profile colorants. Determining the color of the overprint involves determining the coverage percentages of the modified colorants corresponding to the colorants of each subset and using the coverage percentages of the modified colorants to determine the color of the overprint. Van de Capelle et al. is directed to determining the color appearance of color overprints, but does not teach a graphical user interface enabling simulation of production press spot ink behavior on a digital press.

The disclosed embodiments provide examples of improved solutions to the problems noted in the above Background discussion and the art cited therein. There is shown in these examples an improved method for enabling adaptive print job content processing as a function of the electronic format and content of files received in a digital print production environment. Access is provided to a display in the form of a user interface able to select job content processing options. The method includes receiving a print job description in one or more electronic format files, with the print job including supplementary information for one or more electronic format files. Depending on the electronic format of the files, job programming options are structured. Programming options are presented on the user interface for review by an operator. If the operator has indicated a modification to a parameter value(s), the processing parameters are adjusted. The electronic format files are then processed according to the adjusted processing parameters or according to the presented programming options if no modifications have been made to the parameter value(s).

In another embodiment there is provided a print production system controller having a display in the form of a graphical user interface for providing the capability for selecting job content processing options and enabling adaptive print job content processing as a function of received electronic files content. The controller includes means for receiving print jobs having original design files or design files in electronic format file and supplementary information. The controller structures job programming options depending on the supplementary information of the electronic format files and presents the programming options on the user interface for review by an operator. The job programming options may include parameters, parameter value(s) and parameter selectability, among other possibilities. The system determines whether the operator has indicated a modification to one or more parameter values and adjusts the parameter values accordingly. The electronic format files are then processed according to the adjusted processing parameters or according to the presented programming options if no modifications have been made to the parameter value(s).

In yet another embodiment there is provided a computer-readable storage medium having computer readable program code embodied in the medium. When the program code is executed by a computer, the program code causes the computer to perform method steps for enabling adaptive print job content processing as a function of the electronic format and content of files received in a digital print production environment providing access to a display in the form of a user interface able to select job content processing options. The method includes receiving a print job description in one or more electronic format files. The print job description includes supplementary information. Depending on the supplementary information, job programming options are structured. The job programming options may include parameters, parameter value(s) and parameter selectability, among other possibilities. Programming options are presented on the user interface for review and possible modification by an operator. A determination is made whether operator modifications have been requested. If so, processing parameters are adjusted for the print job based on the operator modifications. The electronic format files are then processed according to the adjusted processing parameters or the original job programming options if no operator modifications are requested.

BRIEF DESCRIPTION OF THE DRAWINGS

The foregoing and other features of the embodiments described herein will be apparent and easily understood from a further reading of the specification, claims and by reference to the accompanying drawings in which:

DETAILED DESCRIPTION

Figure 1:
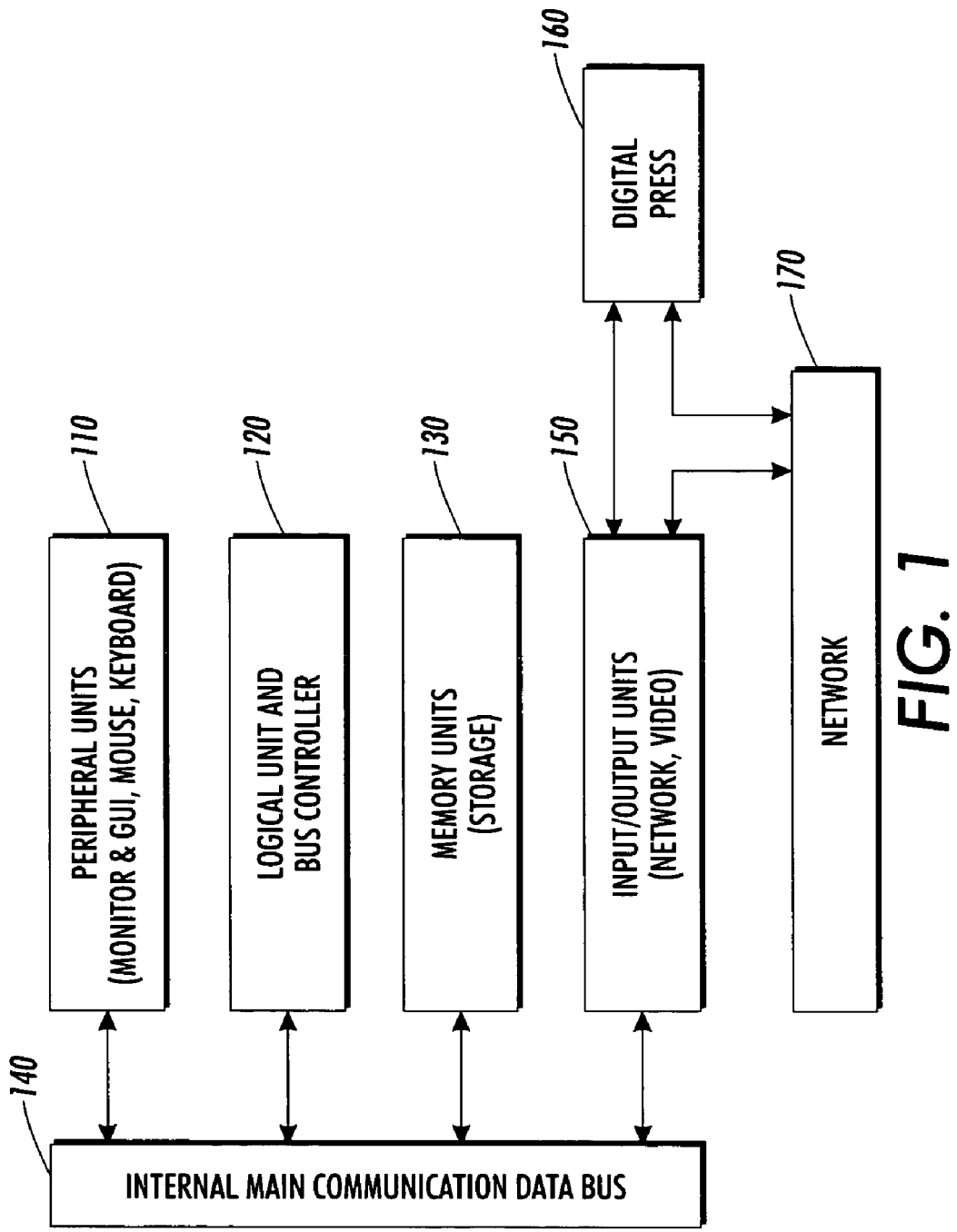
FIG. 1 is a functional block diagram of one embodiment of a printing system in which the page definition language content sensitive user interface may be utilized.

In the following detailed description, reference is made to the accompanying drawings, which form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the disclosure. The following detailed description is, therefore, not to be taken in a limiting sense.

Print jobs can be delivered to a printing system in various ways, utilizing different types of electronic files. These electronic files may be an integral part of the job itself and can be provided in either an application format, or in a page description language (PDL) format. For the purposes herein, the term PDL will be used for both native application files as well as file formats typically designated as PDL formats, such as PDF and PS. As well as different types of electronic files, a print job may include one or a multiple of electronic files providing supplementary information. The files providing supplementary information may describe certain properties of the print job (for example, whether the job contains images), image resolution information, job production instructions, or job intent instructions (for example, identifying which inks will be used as real printing inks or indicating the desired end product format, such as a signature booklet, 8.5×11", glossy 120 gsm paper).

In general, PDL content sensitive GUI options are not being used in the industry. In contrast it is common practice to display all possible PDL processing options for a certain PDL type, even though some of these options may not influence the specific PDL's processing because of the PDL's content. This can be confusing to the operator, who may change a setting thinking it will affect the printer output, only to discover that the change did not provide the expected result.

The method and system for utilizing a user interface described herein provides the capability for performing a Print job content analysis step, if required, on a print job submitted to a print controller for those cases in which the print job includes supplementary information. The file for the print job is analyzed for specified inks (Spot inks and CMYK (cyan, magenta, yellow, and black, respectively)), and if at least one spot ink is being used, the graphical user interface displays these inks and provides an operator with the option of choosing whether the ink is intended to be used as an ink on a production press. Operator selection affects the overprinting behavior of the ink with other objects on the page and will be adapted to reflect the capabilities of the production press on the digital press. While for the purposes of explanation the user interface will be described as functioning within a document production system to direct printing operations, it will be appreciated by those skilled in the art that the user interface may be beneficially utilized in any production environment which requires the simulation of the appearance of specified inks on a substrate. All such variations and modifications are fully contemplated by the scope of the specification and claims herein.

Various computing environments may incorporate capabilities for supporting document production capabilities utilizing printing system controllers, print submission utilities and finishing equipment on which the ink handling user interface may reside. The following discussion is intended to provide a brief, general description of suitable computing environments in which the method and system may be implemented. Although not required, the method and system will be described in the general context of computer-executable instructions, such as program modules, being executed by a single computer. Generally, program modules include routines, programs, objects, components, data structures, etc., that perform particular tasks or implement particular abstract data types. Moreover, those skilled in the art will appreciate that the method and system may be practiced with other computer system configurations, including hand-held devices, multi-processor systems, microprocessor-based or programmable consumer electronics, networked PCs, minicomputers, mainframe computers, and the like.

The method and system may also be practiced in distributed computing environments where tasks are performed by remote processing devices that are linked through a communication network. In a distributed computing environment, program modules may be located in both local and remote memory storage devices.

Referring to FIG. 1, the functional block diagram illustrates an example embodiment of a printing system in which the graphical user interface for simulation of production press spot ink behavior on a digital press may be provided. Operators can access the graphical user interface by any known means, for example through a workstation dedicated to the printer, from a personal desktop via a remote user interface, or via an Internet print submission. The computers typically have a logical unit and bus controller 120, memory units 130, such as random-access memory, read-only memory, and one or more storage devices, such as a hard drive, CD-ROM, DVD, diskette, etc., as well as an interface to a network and a video interface printing capability in the form of a digital press 160. The logical unit and bus controller 120 is operatively coupled to input/output units 150, such as a display device, peripheral units 110, such as a keyboard, mouse, or pointer, and internal main communication data bus 140. The output device 150, for example a monitor, displays information for viewing by an operator of the computer and the input device 110 is used to control a screen pointer provided by the graphical user interface of the operating system.

The computers and printing capability are coupled together and communicate via a network 170. In one embodiment, the computer includes a modem and corresponding communication drivers to connect to the Internet via what is known in the art as a "dial-up connection". In another embodiment, the computers are coupled together in only a local-area network (LAN). In yet another embodiment, the computers include an Ethernet or similar hardware card to connect to the local-area network that itself is connected to the Internet via what is known in the art as a "direct connection". In further embodiments, the computer may be connected to the Internet using a cable modem or satellite Internet connectivity.

The system and method herein are not limited to a particular type of network system to which the computers are connected. Typical network interfaces include general-purpose systems such as POTS (plain-old telephone systems) and ISDN (Integrated Services Digital Network), as well as special-purpose systems such as a LAN (local-area network) or a WAN (wide-area network). Such networking environments are commonplace in offices, enterprise-wide computer networks, intranets and the Internet. Those skilled in the art will appreciate that the principles of the system and method described herein can be applied to virtually any network system without departing from the scope of the claims and specification.

In this context, the internal main communication data bus 140 includes any mechanism for letting the various components of the system communicate with each other as intended and may be in the form of a plurality of communication busses. Input/output units 150 typically include a display controller and a display device coupled to the controller. The display device may be a cathode ray tube (CRT), a flat-panel device such as a liquid crystal display (LCD), or a projection device. The display controller provides control signals to the display device and normally includes a display memory (not shown in the figure) for storing the pixels that appear on the display device.

Figure 2:
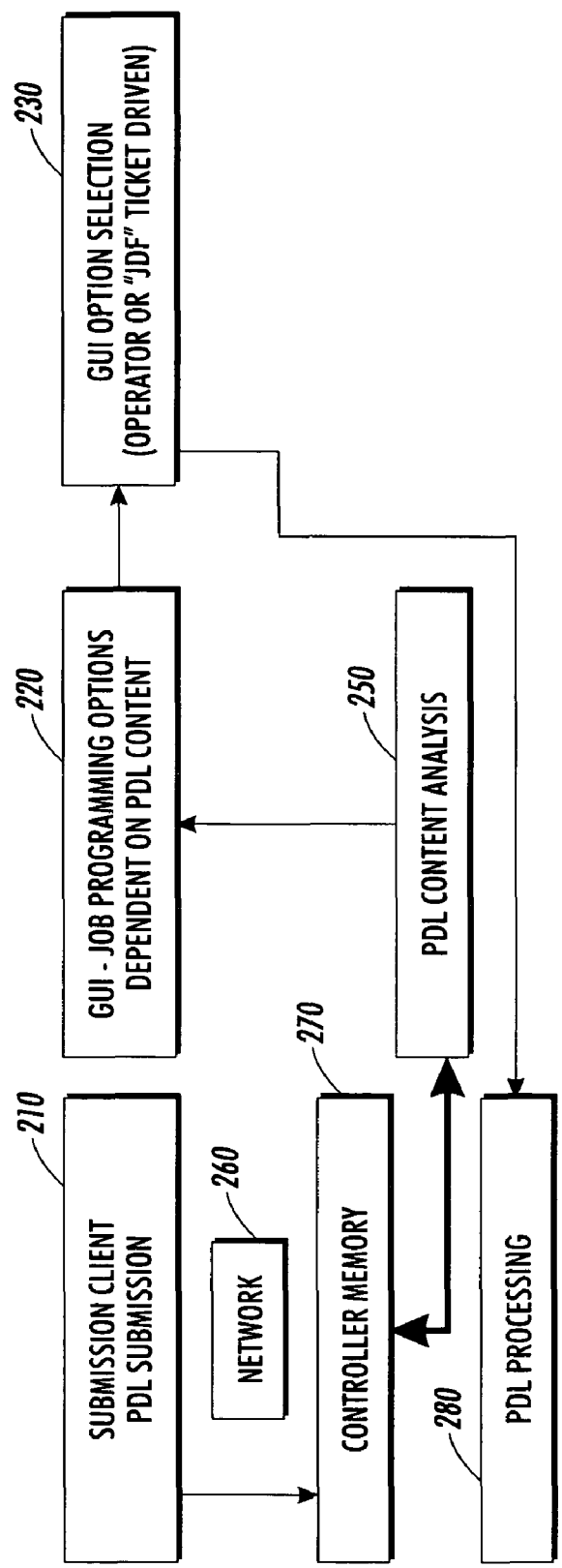
FIG. 2 is a functional block diagram illustrating electronic format file content dependent print job content processing.

Turning now to FIG. 2, there is shown operation of one embodiment of the graphical user interface for PDL content dependent print job content processing. In this embodiment, processing of the Page Description Language (PDL) file is dependent on a selected graphical user interface option. According to the current state of the art, printing originals are reproduced electronically. In this case, the images are scanned in a color scanner or generated using digital cameras and stored in the form of digital data. Texts are generated with text processing programs and graphics with drawing programs.

The data formats largely used to describe the printing originals are the page description languages (PDL) PostScript® and PDF (portable document format). Spot colors are used within a PDL to define colors, which may be rendered with CMYK inks or with a spot ink. Overprints of spot inks and CMYK inks have a different appearance than if the spot color is rendered with CMYK inks. Printing of such a PDL on a CMYK digital press can be accomplished by emulating the behavior of the production press combined with knowledge of the real printing inks used on the press. In a first step, the PDL data is converted in a raster image processor (RIP) into color separations C, M, Y, and K before the recording of the printing originals. However, existing controllers for print systems do not provide the capability for analyzing a file for specified inks and adapting the job to be produced on the digital press to obtain correct overprinting behavior. The graphical user interface described herein provides programming options that are PDL content dependent, with PDL RIP processing dependent on operator-selected user interface options.

Submission client 210 receives original design files and converts these files to a PDL format, or alternatively the submission client receives files in a PDL format. Typical client applications allow the operator to design and compose the job and adjust layout and colors as desired prior to submitting the design files. The resulting PDL files are transmitted over network 260 to controller memory 270. The transmitted files can either be spooled to the controller's hard disk or it may be directly stored into the DFE's memory for further processing. Typically, a PDL is spooled to the hard disk of the controller and is stored, until the front end can start processing the job. The job processing is defined by the virtual printer settings, the job ticket, and the PDL content.

PDL Content Analysis module 250 analyzes the file for specified color spaces, such as CMYK and RGB, and the presence of spot colors in the PDL. The PDL content analysis is a Print job content analysis step that consumes the PDL and looks for required and embedded resources (fonts, color profiles, images defined with OPI (Open Prepress Interface), the color spaces used, the inks used, the images and their format, color space, resolution, etc. The output of the Print job content analysis operation may be, for example, an organized list of all these items. The identity of inks included in the file is transmitted to Job Programming Options Module 220, which structures job programming options depending on the inks identified in the file.

The spot inks which occur in the job will be presented to the operator as job programming options presented on the user interface 230, enabling the operator to specify how the job will be printed and finished. A number of example conditional processing actions and GUI options include but are not limited to:

If the job does not contain any elements defined in RGB color spaces, then the RGB color selection options can be grayed out. If the job does contain RGB elements all RGB to device color space conversion selections become available.

If the job contains any embedded profile information, then options can be displayed to 1) discard the embedded profiles altogether, 2) match the embedded profiles with system profiles and if no match is found either ignore them or 3) replace them with a default. If no embedded profiles are found, then an option can be provided to embed a profile or not.

If the job is pre-imposed but the printing and finishing cannot handle this imposition, a "de-impose" and "re-impose" option can be provided. The re-impose step is then the same as if the job were not yet imposed, in which case the imposition options can be limited to only the feasible imposition schemes, given the finishing and printer capabilities, and the job's page size and number of pages.

If the job is already trapped, and traps are located in a separate trap-layer, a GUI option is provided to keep or discard the traps and in the latter case to either re-trap or not trap the file. If the job already contains traps in a separate layer, and the operator wants to keep those traps, a GUI option can be provided to adjust the average trap width to the recommended trap width of the specific output device; an indication can be given of the average width of the traps. If the job is not yet trapped only the choice between trapping and not trapping is provided in the GUI.

If the job contains process (press) control marks a GUI option is provided to remove the marks and either replace them or not with a different set of control marks. If the job does not contain press control marks an option is provided to add process control marks.

If the job is a variable data job, additional job programming selections are shown, such as record selection for proofing, record validity checking options (e.g., are all items within the records are specified, not too long etc.). If the job is not a variable data job these GUI options are not shown.

If the job contains RGB images, options to apply automatic image enhancement are presented, and if there are no RGB images, this option is not displayed.

If the job does not contain any images, all image processing options are hidden.

The selection of the option(s) may be automated by providing guidelines (as supplementary information) in the job ticket (which includes the metadata necessary to successfully produce the desired end product) accompanying the PDL, for example, through the standard Job Definition Format (JDF). Such guidelines could for instance include the production press capabilities, digital press capabilities, color processing options, non-color processing options, or which inks are to be used on the non-digital production press, and this information can then be readily used by automated Print job content processing if the file is sent to a digital production press which may not have the spot inks used in the PDL. The operator's selections on the user interface are provided to Print job content processing Module 280, which adjusts the color specification for the file to reflect the use of specific ink(s).

Figure 3:
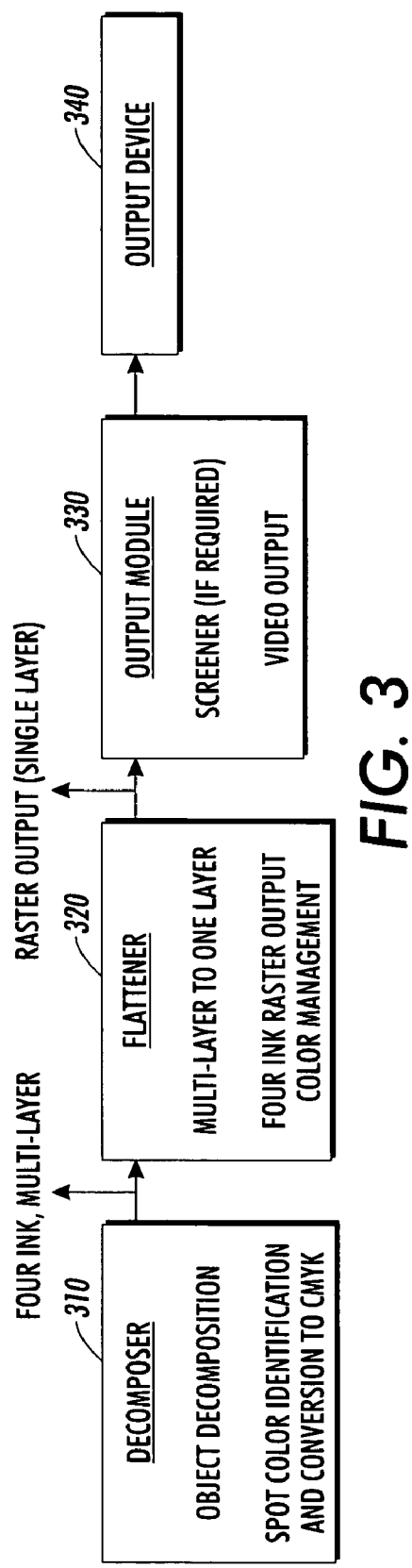
FIG. 3 is a functional block diagram of one embodiment of a controller for simulation of production press spot ink usage on a digital press utilizing electronic format file content dependent print job content processing.

Referring now to FIG. 3, one embodiment of a functional diagram of the PDL content dependent control module is illustrated. This embodiment includes decomposer 310, flattener 320, output module 330, and output device 340. Decomposer module 310 decomposes objects into what is sometimes referred to as a "display list". In this representation of the document, the objects have lost their specific identity, e.g., text is no longer defined by the characters, the font and its attributes, but by a format, which eases determination of overlaps between graphic objects, such as images, vignettes, contours, text, etc., in different layers of the PDL. The Decomposer module also provides spot color identification and conversion to CMYK if needed according to the intent of spot ink usage.

While existing decomposers within print controllers automatically convert spot color to CMYK and transmit a four-ink, multi-layer file to a flattener module, the embodiments disclosed herein convert to CMYK only if the intent of the spot ink usage requires it and transmit a multi-ink, multi-layer file to flattener module 320. According to the current state of the art, a flattener module converts a multi-layer file to a single layer and provides four-ink raster output to an output module. This transforms color from the four-color "source" CMYK color space to the four-color output CMYK color space. Flattener module 320 as described herein converts a multi-layer file to a single layer and provides multi-ink raster output. The number of intended output inks is indicated on the graphical user interface following PDL content analysis as job programming options.

A conventional output module may provide a screener if the output device requires screened input (e.g., 1 bit high resolution data), or it may output 'contone or gray scale' data, usually in an 8 bit representation, and possibly more than 8 bit, at a somewhat lower resolution. In some cases this is also referred to as the video output, even though the file will be printed, and the data is not shown on a display. For the embodiments described herein, output module 330 includes a screener (if required) video output, and color management. A screener converts continuous tone data (8 bits per pixel) at a lower spatial resolution into one bit per pixel data at a higher spatial resolution, sometimes referred to as dots. The result appears as a continuous tone image to the human eye, because the human eye is not able to discern the higher spatial resolution dots individually. Instead, it perceives an average, which appears as "continuous tone or gray scale".

Color management may also be done within the flattener module, depending on where the boundary line between the flattener and the output module is drawn. In either case though, the color management module has full knowledge of the inks intended to be used on the (non-digital) production press and the overprint and transparency settings for each of the flattened objects. With this information the proper flattening operations can be performed, and then the resulting single layer N colorant can be transformed to the output color space of the digital press, which can be a CMYK color space, or an M ink color space. As mentioned above, this last color management step may be performed either in the flattener or in the output module. Output device 340 receives the file with color management instructions and prints a sample of the file on a digital printer.

Figure 4:
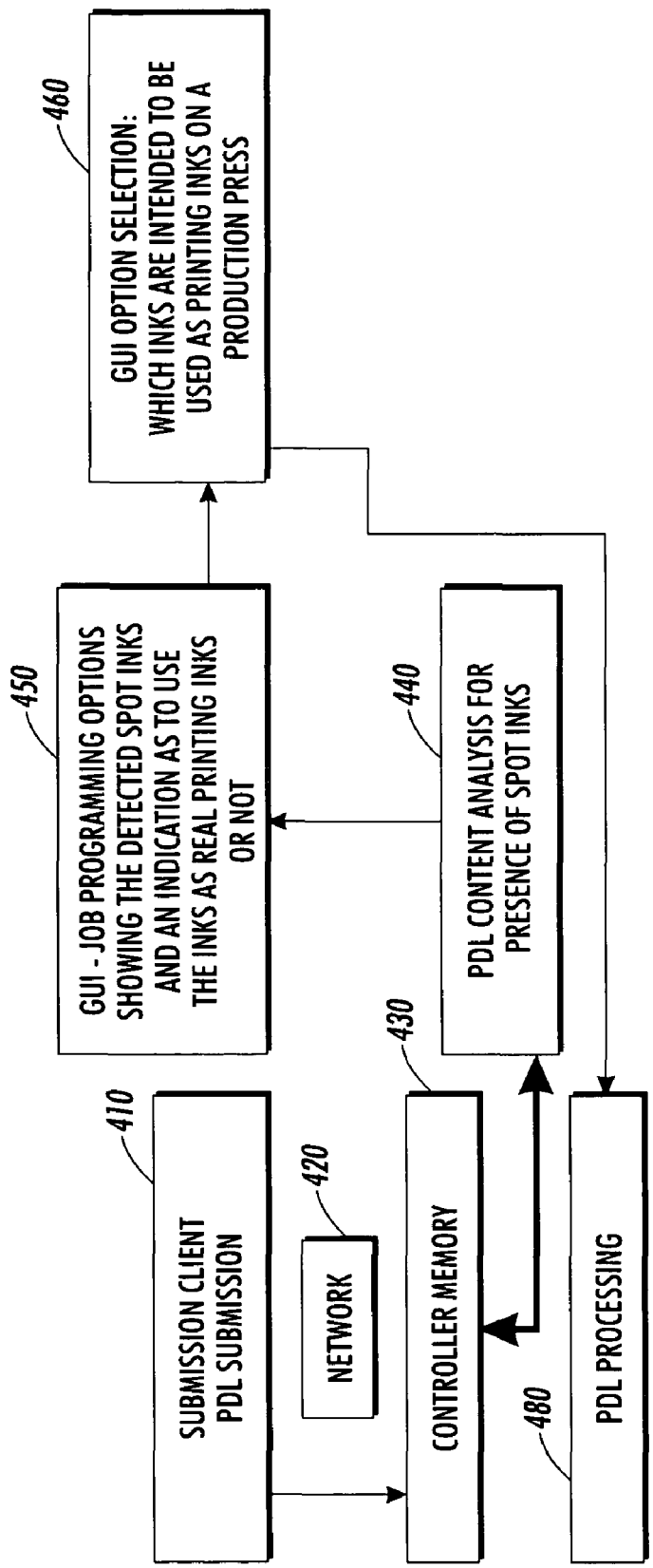
FIG. 4 is a flow chart illustrating electronic format file content dependent print job content processing for spot ink processing.

Turning now to FIG. 4, there is shown operation of an embodiment of the graphical user interface for handling spot color inks. In this embodiment, Print job content processing is dependent on the identity of selected spot printing inks, on the specific output capabilities of the digital press, and on the finishing capabilities. Specifically, overprint behavior is changed with CMYK inks. Submission client 410 receives print originals from an operator and converts the originals to a PDL format. The originals in PDL format are transmitted over network 420 to controller memory 430. The transmitted files can either be spooled to the controller's hard disk or it may be directly stored into the DFE's memory for further processing. Typically, a PDL is spooled to the hard disk of the controller and is stored, until the front end can start processing the job. The job processing is defined by the virtual printer settings, the job ticket, and the PDL content. The PDL content analysis is a Print job content analysis step that consumes the PDL and looks for required and embedded resources (fonts, color profiles, images defined with OPI), the color spaces used, the inks used, the images and their format, color space, resolution, etc. The output of the Print job content analysis operation is for instance an organized list of all these items.

PDL Content Analysis module 440 analyzes the file for the presence of spot inks, and determines whether any spot ink(s) is being used for those cases in which sufficient information of this type is not provided through supplementary information accompanying the job description. The identity of spot inks included in the file is transmitted to Job Programming Options Module 450, which lists the detected spot inks and provides an indication as to whether each identified spot ink is being used as a real printing ink. These job programming options are presented on the graphical user interface 460, enabling the operator to specify which inks are intended to be used as printing inks on a production press.

These options may be in the form of giving the operator the ability to turn overprint on or off for specific inks identified in the file. If the overprint option is not selected for a certain ink, objects defined with this ink will "knock out" or displace underlying objects; if overprint is selected for a specific ink, objects defined with this ink will "overprint" underlying objects. The resulting overprint operation would match the overprint characteristics of the production press. As another example, in some cases the "overprint" attribute may be turned on for a certain object within the PDL. If the object is defined with an ink, which is designated as a real production press ink, then the overprinting attribute can be simulated on the digital press. If the object is defined with an ink which is not a separate production press ink, then the ink is converted to CMYK and a different overprint model will be used. Alternatively, the selection of the option(s) may be automated by providing guidelines in the job ticket accompanying the PDL, for example, through the standard Job Definition Format (JDF). The operators selections on the user interface are provided to Print job content processing Module 480, which adjusts the color specification for the file to reflect the use of specific spot color ink(s).

For example, for a certain spot ink, the operator could indicate whether the ink was intended to be used as a real ink on a (non-digital) production press, or whether the spot ink was merely used to convey the design color, which would have been printed in CMYK on the (non-digital) production press. If within the PDL certain objects, using this spot ink, would be defined as overprinting the underlying objects, then the emulation of this job on the digital production press would depend on whether this ink was really intended to be used as a printing ink or whether it was intended to be printed with CMYK inks.

Figure 5:
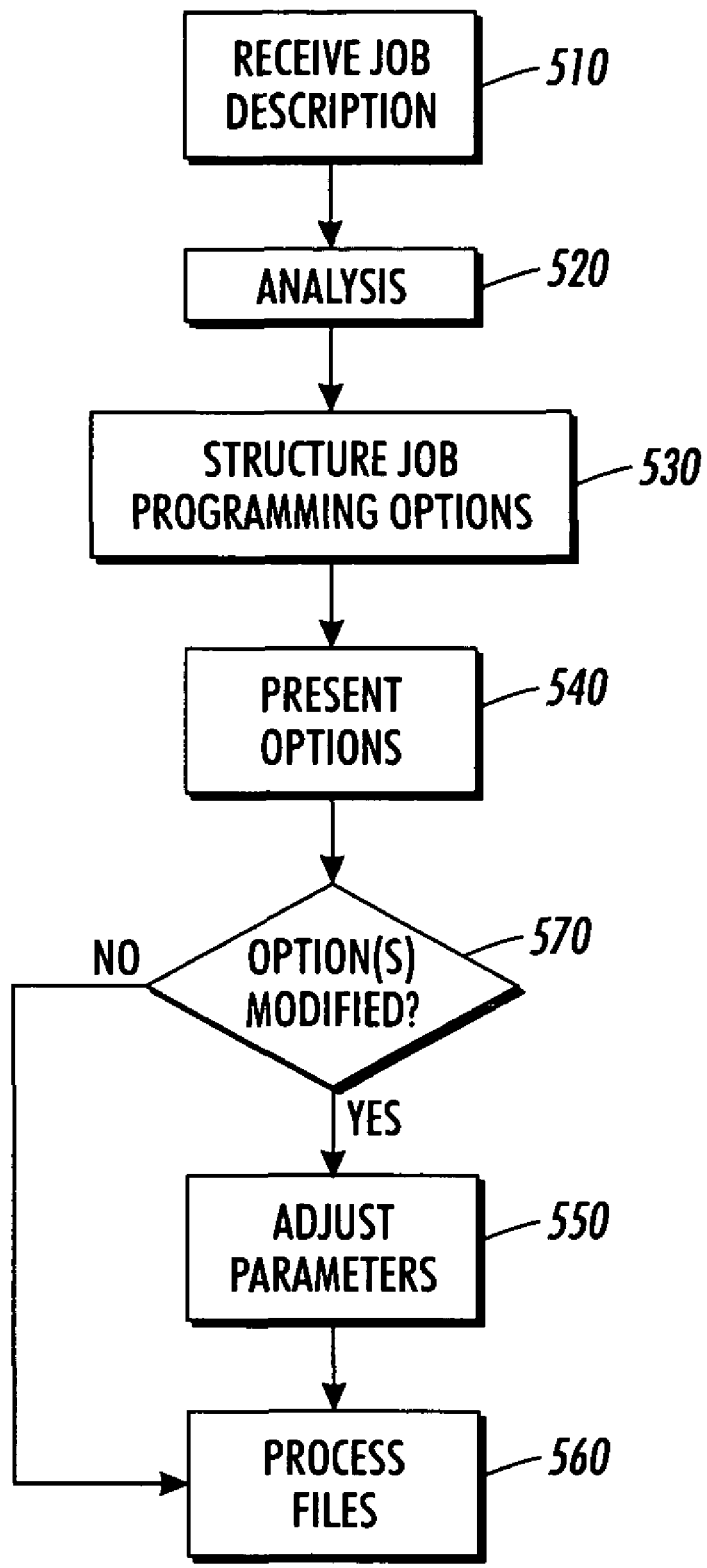
FIG. 5 is a flow chart illustrating one embodiment of a method for electronic format file content dependent print job content processing.

Turning now to FIG. 5, the flow chart illustrates an example embodiment of the method for utilizing the graphical user interface for handling electronic file content dependent electronic file processing. At 510 the system receives a job description in the form of electronic files from an operator or via some network or Internet connection or in the form of a job selected by the operator from a listing of print jobs on the user interface. The job description includes supplementary information, which may, for example, include the job ticket and/or analysis results performed prior to receipt of the job by the system.

The supplementary information may be in the form of a preflight report or a certain job ticket, such as standard Job Definition Format (JDF). The ticket could for instance indicate that a certain spot ink is intended to be used as a real printing ink, and when the job programming options are structured this information can be included. The ticket could for instance also indicate the output intent of the document, the required imposition, the definition of color spaces etc. Analysis results may include, for example, the presence or absence of required resources, embedded resources (fonts, color profiles, images defined with OPI (Open Prepress Interface), the color spaces used, the inks used, the images and their format, color space, resolution, etc.

At 530 the system then structures job programming options depending on the supplementary information provided with the job. Job programming options may include, for example, parameters, parameter values, parameter selectability, and other job programming options known in the art. Structuring of the option(s) may be automated by receipt of guidelines (in the form of supplementary information) for instance in the job ticket accompanying the PDL, or for instance in the preflight report accompanying the PDL. In step 540 the options structured in 530 are presented to the operator, who can then inspect the presented options and make the appropriate selections if needed. For instance, if the job does contain RGB elements without a color space definition, the operator can define the RGB color space, as discussed more fully with reference to FIG. 2 herein. The options may be in various forms, including giving the operator the ability to indicate whether or not are meant to be real printing inks on a production press or mere color definitions and to turn overprint on or off for specific inks identified in the file. If the ink is meant as a mere color definition it will be treated as a spot color; if a specific ink is meant as a production press real ink and overprint is selected for that specific ink, then the resulting overprint operation would match the overprint characteristics of the production press. As also mentioned above, the overprint attribute can be embedded within the PDL, and the PDL processing behavior can be adjusted based on the indication whether the ink is a real printing ink or not. In one aspect of this invention all job processing options can be accepted and no adjustments need to be made in 550.

As another example, if the file does not contain RGB elements, a provision is made to either disable or remove the RGB programming options. As a second example, if the file contains RGB elements, but the RGB color space is not defined, a provision is made to display possible RGB color space definitions. As a third example, if the file contains RGB elements and they are defined, a provision is made to show the color space definition used and for the user to either accept that definition, or replace it with another definition. As a fourth example, for all detected spot inks a provision is made to show a GUI element allowing the operator to select whether the ink is used as a real printing ink or not. As one skilled in the art will appreciate, many such examples could be provided, all of which are contemplated by the scope of the specification and claims herein.

A determination is made at 570 as to whether any parameters have been modified by the operator. If any options have been modified, the parameters are adjusted in 550 to reflect the modifications and the job files are processed at 560. If no options have been modified, the job files are processed in accordance with the original options presented on the user interface.

In an alternate example embodiment, the supplementary information may not be sufficient to fully structure job programming options. In this case additional analysis is performed after the job description has been received. This additional analysis consumes the one or more electronic files and, for example, searches for required and embedded resources (fonts, color profiles, images defined with OPI (Open Prepress Interface), the color spaces used, the inks used, the images and their format, color space, resolution, etc. This information is then utilized in structuring job programming options. The output of the additional job content analysis operation may be, for example, an organized list of all these items, which can be considered as additional supplementary information. The entire set of supplementary information, consisting of the initial supplementary information and the results of the analysis step, is then utilized to structure job programming options.

While the method has been described with reference to a user interface having buttons, a touch screen, or icons to make selections and perform operations, it will be appreciated by one skilled in the art that the method may be practiced by a series of screen prompts through the user interface, which is fully contemplated by the specification and scope of the claims herein.

While the present discussion has been illustrated and described with reference to specific embodiments, further modification and improvements will occur to those skilled in the art. For example, graphical user interface options that are not relevant for the PDL may be disabled, depending on the PDL content, e.g., if a file contains only CMYK and spot ink defined colors, all RGB options may be disabled.

Alternatively, the user interface and its method of operation described herein may also be applied in any workflow SW products that do not explicitly RIP the PDL file, yet which produce another PDL file, often referred to as a "normalized" PDL file. In such a product the normalization process and different GUI options of the normalization process would be driven by the PDL content. In such a workflow product the emphasis is often shifted towards automation of the normalization process and the indication of the relevant parameters can be done before the analysis and processing of the PDL begins. For instance, it can be indicated which inks are considered printing inks before the analysis and processing of the PDL begins, after which (many) PDL files are being processed without any further user interaction.

Also, specification of PDL content dependent conditional processing at any inspection or manual correction point in the workflow can depict PDL content dependent GUI options. For instance, before the analysis and processing of the PDL begins it can be indicated that Spot color Xc is meant to be a printing ink, any other spot colors are to be considered as spot colors, not printing inks. A particular PDL may contain Xu, which will be discarded as printing ink. At an operator inspection point in the workflow product, the decisions made by the workflow product can be indicated, and an option to reverse the decision made by the product may be available. This graphical user interface and its method of operation may also be applied to variable data jobs, which often consist of multiple sets of PDL files, which are combined depending on the specific variable data record that needs to be printed.

Additionally, "code" as used herein, or "program" as used herein, is any plurality of binary values or any executable, interpreted or compiled code which can be used by a computer or execution device to perform a task. This code or program can be written in any one of several known computer languages. A "computer", as used herein, can mean any device that stores, processes, routes, manipulates, or performs like operations on data. It is to be understood, therefore, that this disclosure is not limited to the particular forms illustrated and that it is intended in the appended claims to embrace all alternatives, modifications, and variations that do not depart from the spirit and scope of the embodiments described herein.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that several of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

What is claimed is:

1. In a digital print production environment providing access to a display in the form of a user interface able to select job content processing options, a method for enabling adaptive print job content processing as a function of the PDL content, the method comprising:

identifying spot colors within a print job;

receiving a job ticket for a print job in at least one electronic format file, wherein said job ticket includes supplementary information including non-digital production press capabilities, digital press capabilities, color processing options, non-color processing options, or inks to be used on said non-digital production press;

structuring job programming options depending on said supplementary information, wherein said job programming options include at least one parameter, at least one parameter value, and parameter selectability;

presenting said job programming options on the user interface for selection by an operator wherein said job programming options are based on determinations of whether said print job contains elements defined in RGB color spaces, whether said print job contains embedded profile information, whether said print job is pre-imposed, whether said print job is trapped, whether said print job contains process control marks, whether said print job is a variable data job, and whether the print job contains RGB images, and wherein said job programming options are configured to allow said operator to select which of said spot colors are intended for use as real printing inks;

disabling user interface programming options that are not relevant for processing said electronic file;

determining whether said operator has selected a modification to said at least one parameter value;

adjusting said at least one parameter value for said print job if said operator has selected a modification to said at least one parameter value; and processing said electronic format file according to said adjusted processing parameters.

2. The method for enabling print job content processing options as a function of the file content according to claim 1, wherein said supplementary information includes spot colors present in said job ticket, required and embedded resources including fonts, the color spaces and profiles used, the inks used, the images and their format and resolution, the imposition scheme of the file, the trapping status and trap parameters, printing and/or finishing marks, variable data content, the number of variable data records, and the file format types.

3. The method for enabling print job content processing options as a function of the file content according to claim 1, further comprising analyzing said print job if said supplementary information is not sufficient to enable structuring said job programming options.

4. The method for enabling print job content processing options as a function of the file content according to claim 3, wherein analyzing said print job includes identifying spot colors present in said electronic format files, identifying required and embedded resources including fonts, identifying the color spaces and profiles used, identifying the inks used, identifying the images and their format and resolution, identifying the imposition scheme of the file, determining the trapping status and trap parameters, identifying printing and/or finishing marks, identifying variable data content, identifying the number of variable data records, and identifying the file format types.

5. The method for enabling print job content processing options as a function of the file content according to claim 1, wherein processing comprises color processing or non-color processing.

6. The method for enabling print job content processing options as a function of the electronic files content according to claim 1, wherein processing said at least one electronic format file for color processing includes RGB color processing of said print job, CMYK color processing of said print job, spot color processing of said print job, gray color processing, CIE color processing of said print job, and color correction of said print job.

7. The method for enabling print job content processing options as a function of the electronic files content according to claim 1, wherein processing said at least one electronic format file for non-color processing includes imposing said print job, de-imposing said print job, adding printing or finishing marks, ripping said print job, trapping said print job, selecting page or record ranges, embedding or outlining fonts, rescaling parts of said print job or the entire print job, applying anti-aliasing, applying object decomposition, flattening, screening, and viewing.

8. The method for enabling print job content processing options as a function of the electronic file content according to claim 1, wherein processing includes at least one member selected from the group comprising printing, finishing, or shipping meta data.

9. The method for enabling print job content processing options as a function of the electronic file content according to claim 8, wherein said meta data includes process control marks.

10. The method for enabling print job content processing options as a function of the electronic file content according to claim 1, wherein structuring said job programming options further comprises providing multi-ink raster output.

11. The method for enabling print job content processing options as a function of the electronic file content according to claim 1, wherein adjusting the processing parameters includes utilizing knowledge of inks intended to be used on a production press and the overprint and transparency setting for each object.

12. The method for enabling print job content processing options as a function of the electronic file content according to claim 1, wherein adjusting the processing parameters includes transforming a flattened N colorant output to a digital press color space, wherein said digital press color space may be a CMYK color space, or an N ink color space.

13. The method for enabling print job content processing options as a function of the electronic file content according to claim 1, wherein adjusting the processing parameters further comprises indicating a number of intended non-digital press output inks on the user interface.

14. The method for enabling print job content processing options as a function of the electronic file content according to claim 1, wherein adjusting the processing parameters includes structuring a file with color management instructions and providing it to an output device.

15. The method for enabling print job content processing options as a function of the electronic file content according to claim 1, further comprising presenting options for printing and finishing.

16. The method for enabling print job content processing options as a function of the electronic file content according to claim 15, wherein said options include identifying objects defined as overprinting underlying objects.

17. The method for enabling print job content processing options as a function of the electronic file content according to claim 1, further comprising a communication capability to communicate printing press capabilities to the user interface.

18. The method for enabling print job content processing options as a function of the electronic file content according to claim 17, wherein said job programming options depend on said printing press capabilities.

19. The method for enabling print job content processing options as a function of the electronic file content according to claim 17, wherein said job processing depends on said printing press capabilities.

20. A controller in a digital print production environment providing access to a display in the form of a user interface able to select job content processing options for enabling adaptive print job content processing as a function of the electronic file content, the controller comprising:
  means for identifying spot colors within a print job;
  means for receiving a print job in at least one electronic format file, wherein said print job includes supplementary information including non-digital production press capabilities, digital press capabilities, color processing options, non-color processing options, or inks to be used on said non-digital production press;
  means for structuring job programming options depending on said supplementary information for said at least one electronic format file, wherein said job programming options include at least one parameter, at least one parameter value, and parameter selectability;
  means for presenting said job programming options on the user interface for selection by an operator wherein said job programming options are based on determinations of whether said print job contains elements defined in RGB color spaces, whether said print job contains embedded profile information, whether said print job is pre-imposed, whether said print job is trapped, whether said print job contains process control marks, whether said print job is a variable data job, and whether the print job contains RGB images, and wherein said job programming options are configured to allow said operator to select which of said spot colors are intended for use as real printing inks;
  means for disabling user interface programming options that are not relevant for processing said electronic file;
  means for determining whether said operator has selected a modification to said at least one parameter value;
  means for adjusting said at least one parameter value for said print job if said operator has indicated a modification to said at least one parameter value; and
  means for processing said electronic format files according to said adjusted processing parameters.

21. A non-transitory computer-readable medium having computer-executable instructions for performing steps comprising:
  identifying spot colors within a print job;
  receiving a print job in at least one electronic format file, wherein said print job includes supplementary information including non-digital production press capabilities, digital press capabilities, color processing options, non-color processing options, and or inks to be used on said non-digital production press;
  structuring job programming options depending on said supplementary information for said at least one electronic format file, wherein said job programming options include at least one parameter, at least one parameter value, and parameter selectability;
  presenting said job programming options on the user interface for selection by an operator wherein said job programming options are based on determinations of whether said print job contains elements defined in RGB color spaces, whether said print job contains embedded profile information, whether said print job is pre-imposed, whether said print job is trapped, whether said print job contains process control marks, whether said print job is a variable data job, and whether the print job contains RGB images, and wherein said job programming options are configured to allow said operator to select which of said spot colors are intended for use as real printing inks;
  disabling user interface programming options that are not relevant for processing said electronic file;
  determining whether said operator has selected a modification to said at least one parameter value;
  adjusting said at least one parameter value for said print job if said operator has selected a modification to said at least one parameter value; and
  processing said electronic format files according to said adjusted processing parameters.

* * * * *